UNITED STATES PATENT OFFICE.

RICHARD ATKINSON, OF MOUNT VERNON, NEW YORK.

IMPROVED COMPOSITION FOR PAVEMENTS.

Specification forming part of Letters Patent No. 44,589, dated October 11, 1864.

*To all whom it may concern:*

Be it known that I, RICHARD ATKINSON, of Mount Vernon, in the county of Westchester and State of New York, have invented, made, and applied to use a new and Improved Composition for Pavements, Sub-Cellars, Cross-Walks, and other Purposes; and I do declare the following to be a full, clear, and correct description of the same, reference being had to the specimens accompanying this application.

The nature of my invention consists in combining broken stone, gravel, boiled coal-tar, and hydraulic cement, in about the proportions hereinafter set forth, for the purpose of forming a composition for the paving of highways, carriage-ways, and sidewalks.

To enable others skilled in the art to make and use my improved composition, I will describe the mode of making the same.

When a carriage-way or highway is to be formed of my improved composition the ground is first excavated not less than eight (8) inches, and then filled in for about the depth of six (6) inches with broken stone and coarse gravel in about equal proportions. The broken stone and coarse gravel are then well stamped down, and have poured over them a sufficient quantity of boiling car-tar to constitute a solid foundation. Upon this foundation is laid a coat composed of screened gravel and cement (hydraulic) well mixed with boiling coal-tar. This coating is about two (2) inches thick, is laid white hot, and is rolled immediately to a perfectly-smooth surface. The whole is then covered with fine gravel.

Where a sidewalk is to be formed of my improved composition the ground is excavated to the depth of about four and a half inches, and a foundation four (4) inches thick, composed of broken stone, coarse gravel, and boiling coal-tar, is laid, which is covered with a second coating, of screened gravel and cement, well mixed with boiling coal-tar, and the whole is covered with fine gravel and properly rolled.

The composition as I make it is composed of the ingredients above named in about the following proportions: broken stone and gravel, equal parts of each; boiling coal-tar, a sufficient quantity to cover the broken stone and gravel and fill up all interstices in the same; hydraulic cement, one-eighth part of the coating into which it enters.

The advantages resulting from constructing highways and sidewalks of my improved composition may be thus specified: durability, cheapness, and the fact that the same are rendered water-proof.

Having thus described my invention, what I claim as new, and desire to secure by Letters Patent, is—

Combining broken stone, gravel, boiling coal-tar, and hydraulic cement, in about the proportions specified, to form a composition for the paving of highways, carriage-ways, and sidewalks.

RICHD. ATKINSON.

In presence of—
GEO. P. GORDON,
A. SIDNEY DOANE.